US012732916B2

(12) United States Patent
Cordeiro et al.

(10) Patent No.: US 12,732,916 B2
(45) Date of Patent: Sep. 8, 2026

(54) CONFIGURING BLUETOOTH OPERATION AT HIGHER TRANSMIT POWER USING A WLAN CLIENT-TO-CLIENT (C2C) ENABLING SIGNAL

(71) Applicant: Intel Corporation, Santa Clara, CA (US)

(72) Inventors: Carlos Cordeiro, Portland, OR (US); Xinrong Wang, Portland, OR (US); Hassan Yaghoobi, San Jose, CA (US); Harish Balasubramaniam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/955,680

(22) Filed: Sep. 29, 2022

(65) Prior Publication Data

US 2023/0016476 A1 Jan. 19, 2023

(51) Int. Cl.
*H04W 52/14* (2009.01)
*H04W 52/16* (2009.01)

(52) U.S. Cl.
CPC ......... *H04W 52/143* (2013.01); *H04W 52/16* (2013.01)

(58) Field of Classification Search
CPC .. H04W 52/143; H04W 52/16; H04W 52/383
See application file for complete search history.

(56) References Cited

U.S. PATENT DOCUMENTS

| | | | | |
|---|---|---|---|---|
| 2015/0119071 | A1* | 4/2015 | Basha | G01S 1/68 455/456.1 |
| 2019/0007949 | A1* | 1/2019 | Myers, III | H04W 76/20 |
| 2021/0266847 | A1* | 8/2021 | Cariou | H04W 52/52 |
| 2021/0306832 | A1* | 9/2021 | Juntunen | H04W 4/80 |
| 2022/0094454 | A1* | 3/2022 | Aldana | H04W 74/0808 |
| 2022/0247451 | A1* | 8/2022 | Aldana | H04W 16/14 |
| 2022/0408349 | A1* | 12/2022 | Kneckt | H04W 76/15 |
| 2023/0232329 | A1* | 7/2023 | Chen | H04W 24/10 455/572 |
| 2023/0379128 | A1* | 11/2023 | Wang | H04W 52/283 |
| 2024/0064780 | A1* | 2/2024 | Cheng | H04W 72/40 |
| 2024/0397399 | A1* | 11/2024 | Gupta | H04W 36/322 |

* cited by examiner

*Primary Examiner* — Andrew Lee
(74) *Attorney, Agent, or Firm* — Schwegman Lundberg & Woessner, P.A.

(57) ABSTRACT

An apparatus includes memory and processing circuitry coupled to the memory. The processing circuitry is to decode a client-to-client (C2C) enabling signal received from an access point (AP). The C2C enabling signal indicates the AP is configured for Low Power Indoor (LPI) communication at an LPI signal power level. The signal power of the C2C enabling signal received from the AP is determined. Bluetooth (BT) circuitry of the apparatus is configured for BT communication with a wireless device at the LPI signal power level when the signal power of the C2C enabling signal is above a signal power threshold. The BT circuitry is configured to perform a handshake exchange with the wireless device to initiate the BT communication at the LPI signal power level.

20 Claims, 7 Drawing Sheets

CONFIGURING BLUETOOTH OPERATION AT HIGHER TRANSMIT POWER USING A WLAN CLIENT-TO-CLIENT (C2C) ENABLING SIGNAL

TECHNICAL FIELD

Embodiments pertain to improvements in wireless communications, including improvements in transmit power configuration, including techniques for configuring Bluetooth (BT) operation at higher transmit (Tx) power using a WLAN client-to-client (C2C) enabling signal.

BACKGROUND

Mobile communications have evolved significantly from early voice systems to today's highly sophisticated integrated communication platform. With the increase in different types of devices communicating with various network devices, the usage of wireless systems has increased. The penetration of computing devices (e.g., user equipment or UEs, laptops, tablets, smartphones) in modern society has continued to drive demand for a wide variety of networked devices in many disparate environments. Additionally, many computing devices support communication using different wireless protocols (e.g., WLAN and Bluetooth), which can have different transmit power configurations.

BRIEF DESCRIPTION OF THE DRAWINGS

In the drawings, like numerals may describe the same or similar components or features in different views. Like numerals having different letter suffixes may represent different instances of similar components. Some embodiments are illustrated by way of example, and not limitation, in the figures of the accompanying drawings in which.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

The disclosed techniques can be used to enable Bluetooth devices to operate at higher Tx power levels, while devices that do not implement the disclosed techniques can operate only at lower Tx power levels. For example, Wi-Fi circuitry in a computing device can detect a C2C enabling signal communicated from an access point (AP). Such C2C enabling signal can indicate that the AP is indoors and is configured for Low Power Indoor (LPI) communication at an LPI signal power level (which is higher than the very low power (VLP) power level used for BT communications). After the Wi-Fi circuitry (or a dedicated Tx power configuration circuit) detects the C2C enabling signal received from an AP, the BT circuitry of the computing device is configured for BT communication at a higher Tx power (e.g., at the LPI signal power level). During a handshake operation (or communication) with another client device (e.g., another computing device that includes Wi-Fi and BT capabilities), both computing devices can exchange information and confirm they have both received C2C enabling signals from one or more APs and are both configured for C2C communication or BT communication at higher Tx power (e.g., at the LPI signal power level). After the handshake operation, both computing devices can initiate BT communication at the LPI signal power level as the Tx power level.

Figure 1:
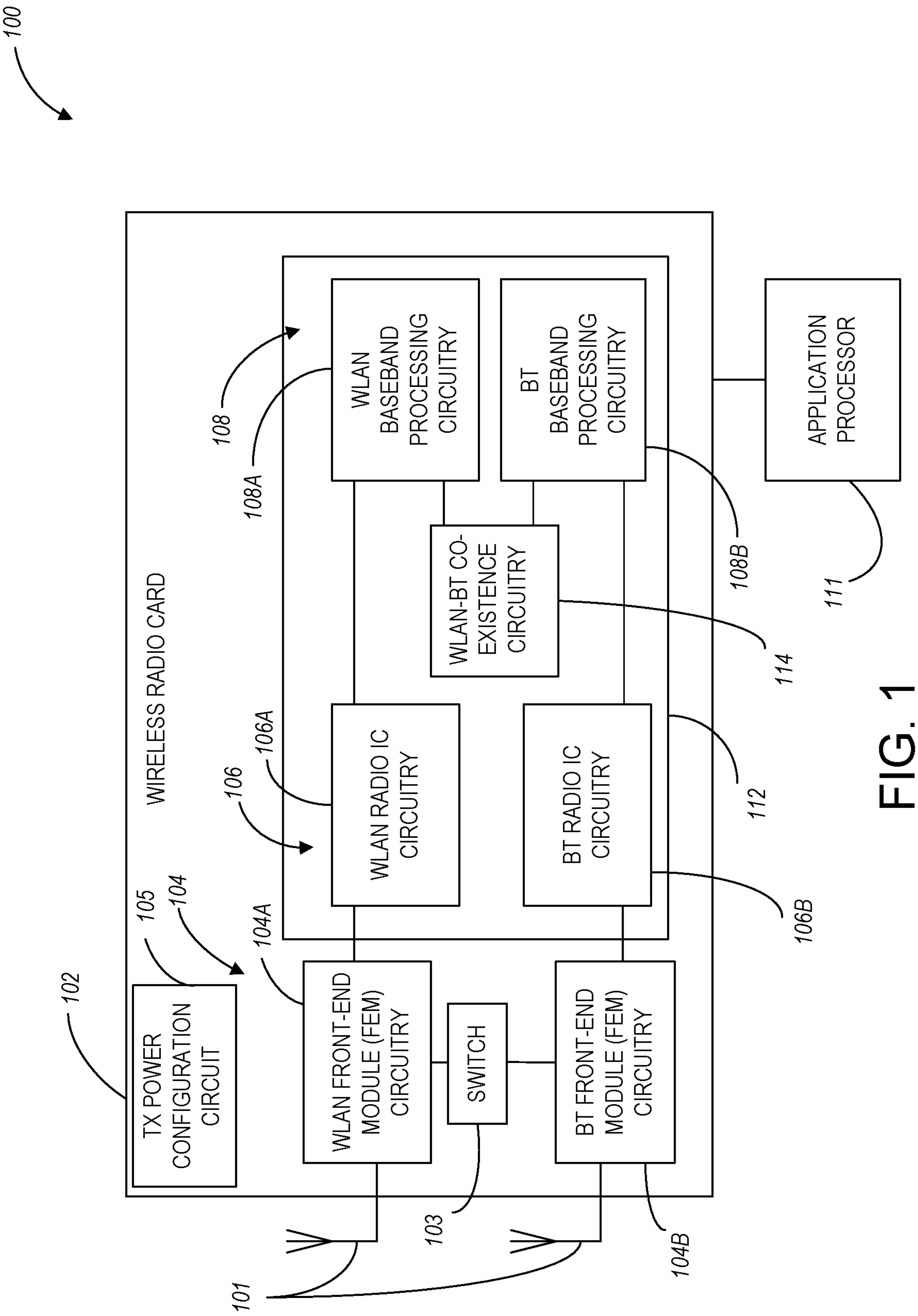
FIG. 1 is a block diagram of a radio architecture including an interface card with a Tx power configuration circuit, in accordance with some embodiments.

FIG. 1 is a block diagram of a radio architecture 100 including an interface card 102 with a Tx power configuration circuit 105, in accordance with some embodiments. The radio architecture 100 may be implemented in a computing device (e.g., device 800 in FIG. 8) including user equipment (UE), a base station (e.g., a next generation Node-B (gNB), enhanced Node-B (eNB)), a smartphone, a personal computer (PC), a laptop, a tablet, or another type of wired or wireless device. The radio architecture 100 may include radio front-end module (FEM) circuitry 104, radio integrated circuit (IC) circuitry 106, and baseband processing circuitry 108 configured as part of the interface card 102. In this regard, radio architecture 100 (as shown in FIG. 1) includes an interface card 102 configured to perform both Wireless Local Area Network (WLAN) functionalities and Bluetooth (BT) functionalities (e.g., as WLAN/BT interface or modem card), although embodiments are not so limited and the disclosed techniques apply to other types of radio architectures with different types of interface cards as well. In this disclosure, "WLAN" and "Wi-Fi" are used interchangeably. Other example types of interface cards which can be used in connection with the disclosed techniques include graphics cards, network cards, SSD cards (such as M.2-based cards), CEM-based cards, etc.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals, and provide the amplified versions of the received signals to the WLAN radio IC circuitry 106A for further processing. The BT FEM circuitry 104B may include a receive signal path which may include circuitry configured to operate on BT RF signals received from the one or more antennas 101, to amplify the received signals, and provide the amplified versions of the received signals to the BT radio IC circuitry 106B for further processing. The WLAN FEM circuitry 104A may also include a transmit signal path which may include circuitry configured to amplify WLAN signals provided by the radio IC circuitry 106A for wireless transmission by the one or more antennas 101. Besides, the BT FEM circuitry 104B may also include a transmit signal path which may include circuitry configured to amplify BT signals provided by the radio IC circuitry 106B for wireless transmission by the one or more antennas. In the embodiment of FIG. 1, although WLAN FEM circuitry 104A and BT FEM circuitry 104B are shown as being distinct from one another, embodiments are not so limited and include within their scope the use of a FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the WLAN FEM circuitry 104A and provide baseband signals to WLAN baseband processing circuitry 108A. The BT radio IC circuitry 106B may, in turn, include a receive signal path which may include circuitry to down-convert BT RF signals received from the BT FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the WLAN FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the BT FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WLAN baseband processing circuitry 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include a physical layer (PHY) and medium access control layer (MAC) circuitry and may further interface with a host processor (e.g., the application processor 111) in a host system (e.g., a host SoC) for generation and processing of the baseband signals and for controlling operations of the radio IC circuitry 106 (including controlling the operation of the Tx power configuration circuit 105).

Referring still to FIG. 1, according to the shown embodiment, WLAN-BT coexistence circuitry 114 may include logic providing an interface between the WLAN baseband processing circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of the one or more antennas 101 as between the WLAN and BT FEMs, or the provision of more than one antenna connected to each of FEM circuitries 104A or 104B.

In some embodiments, the front-end module circuitry 104, the radio IC circuitry 106, and the baseband processing circuitry 108 may be provided on a single radio card, such as the interface card 102. In some other embodiments, the one or more antennas 101, the FEM circuitry 104, and the radio IC circuitry 106 may be provided on a single radio card. In some other embodiments, the radio IC circuitry 106 and the baseband processing circuitry 108 may be provided on a single chip or IC, such as IC 112.

In some embodiments, the interface card 102 can be configured as a wireless radio card, such as a WLAN radio card configured for wireless communications (e.g., WiGig communications in the 60 GHz range or mmW communications in the 24.24 GHz-52.6 GHz range), although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some embodiments, the interface card 102 may include a Tx power configuration circuit 105 configured to perform disclosed functionalities in connection with configuring Tx power (e.g., BT Tx power) of a wireless device. In some aspects, the Tx power configuration circuit 105 can use one or more other circuits of the interface card 102 as well as processing functionalities of one or more processors, such as application processor 111. A more detailed description of the functionalities of the Tx power configuration circuit 105 is provided in connection with, e.g., FIGS. 5-7.

In some of these multicarrier embodiments, radio architecture 100 may be part of a Wi-Fi communication station (STA) such as a wireless access point (AP), a base station, or a mobile device including a Wi-Fi-enabled device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, 802.11ad, and/or 802.11ax standards and/or proposed specifications for WLANs, although the scope of embodiments is not limited in this respect and operations using other wireless standards can also be configured. Radio architecture 100 may also be suitable to transmit and/or receive communications in accordance with other techniques and standards, including a 3rd Generation Partnership Project (3GPP) standard, including a communication standard used in connection with 5G or new radio (NR) communications.

In some embodiments, the radio architecture 100 may be configured for high-efficiency (HE) Wi-Fi communications in accordance with the IEEE 802.11ax standard or another standard associated with wireless communications. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the interface card 102, although embodiments are not so limited, and include within their scope discrete WLAN and BT radio cards.

In some embodiments, the radio architecture 100 may include other radio cards, such as a cellular radio card configured for cellular/wireless communications (e.g., 3GPP such as LTE, LTE-Advanced, WiGig, or 5G communications including mmW communications), which may be implemented together with (or as part of) the interface card 102.

In some IEEE 802.11 embodiments, the radio architecture 100 may be configured for communication over various channel bandwidths including bandwidths having center frequencies of about 900 MHz, 2.4 GHz, 5 GHz, 6 GHz and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 2:
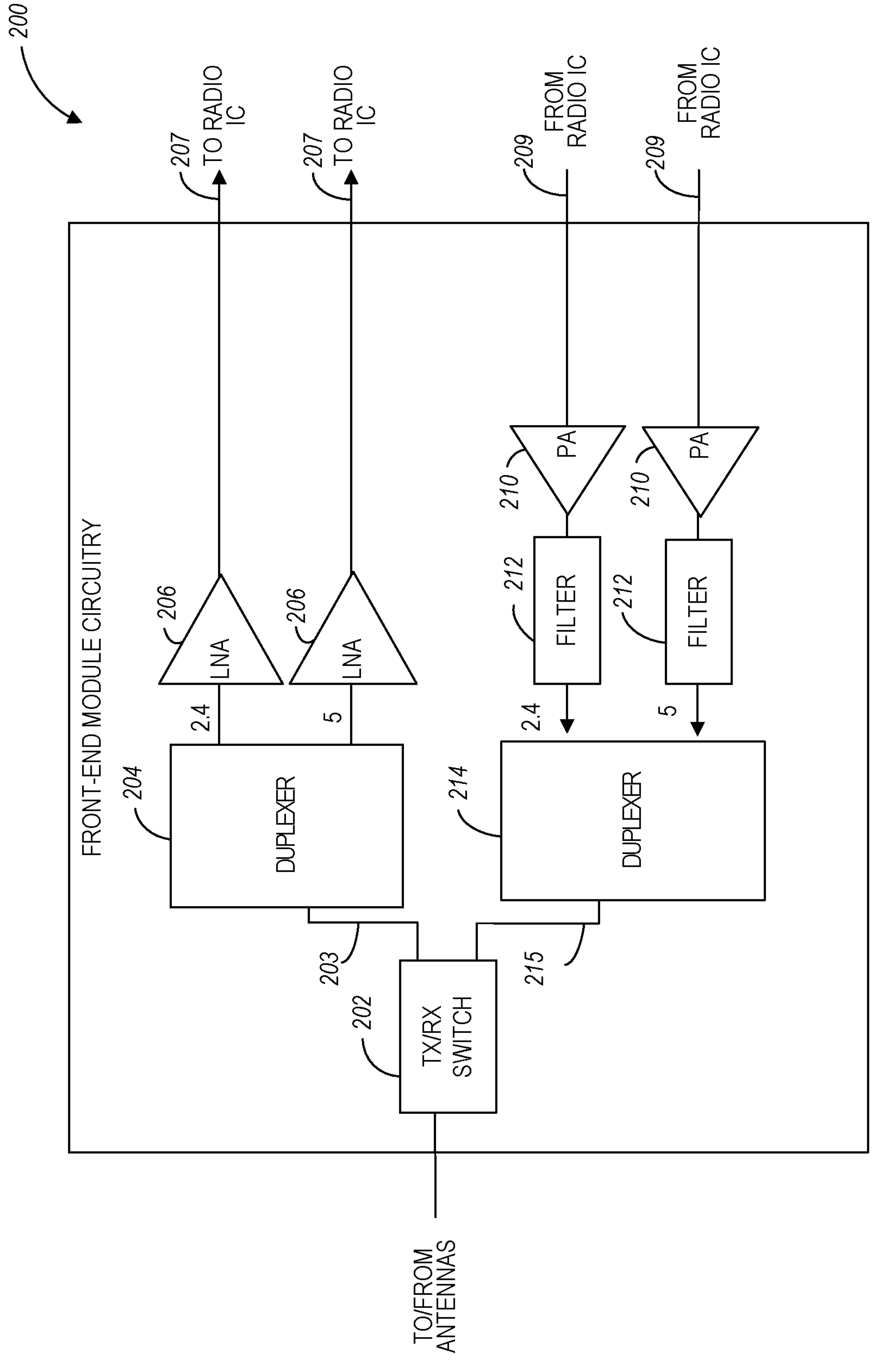
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit (TX) mode and receive (RX) mode operation. In some aspects, a diplexer may be used in place of a TX/RX switch. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in, e.g., either the 2.4 GHz frequency spectrum or the 5 GHz (or 6 GHz) frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier (PA) 210 and one or more filters 212, such as a BPF, an LPF, or another type of filter for each frequency spectrum, and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal path and may utilize the same FEM circuitry 200 as the one used for WLAN communications.

Figure 3:
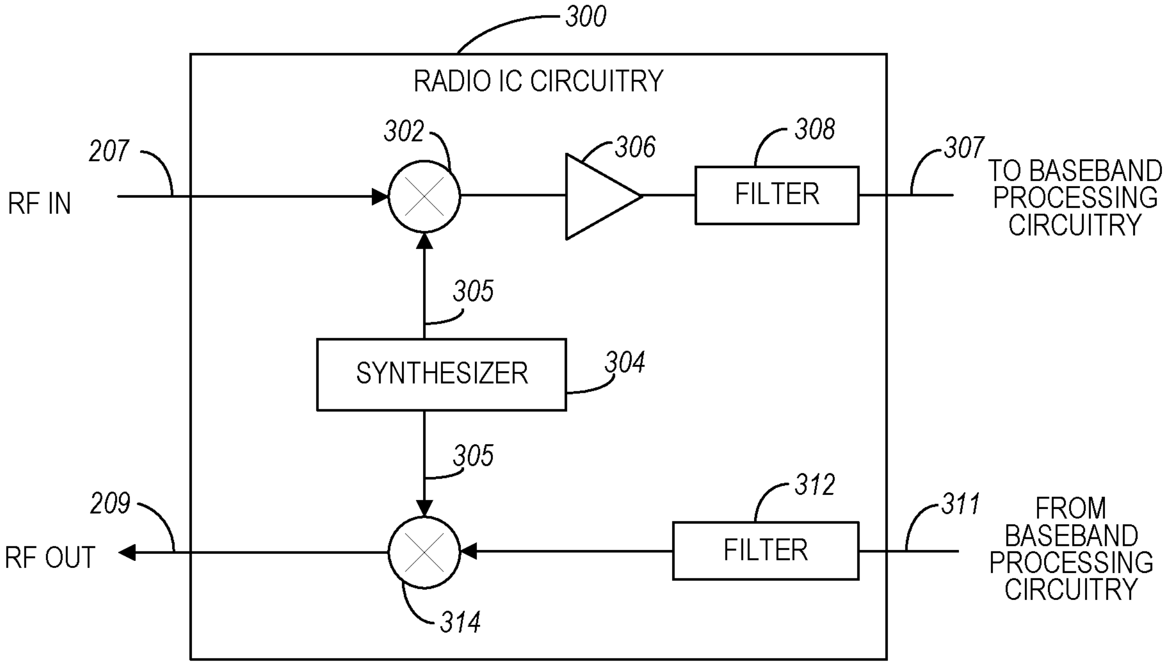
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include at least filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by the synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate the input RF signals 209 for the FEM circuitry 104. The baseband signals 311 may be provided by the baseband processing circuitry 108 and may be filtered by the filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of the synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as synthesized frequency (or LO frequency) 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between the start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or filter circuitry 308 (FIG. 3).

In some embodiments, the output baseband signals 307 and the input baseband signals 311 may be analog, although the scope of the embodiments is not limited in this respect. In some alternate embodiments, the output baseband signals 307 and the input baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. In some embodiments, the synthesizer circuitry 304 may be a delta-sigma synthesizer, a frequency multiplier, or a synthesizer comprising a phase-locked loop with a frequency divider. According to some embodiments, the synthesizer circuitry 304 may include a digital frequency synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage-controlled oscillator (VCO), although that is not a requirement. A divider control input may further be provided by either the baseband processing circuitry 108 (FIG. 1) or the application processor 111 (FIG. 1) depending on the desired frequency output as synthesized frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the synthesized frequency 305, while in other embodiments, the synthesized frequency 305 may be a fraction of the carrier frequency (e.g., one-half the carrier frequency, one-third the carrier frequency). In some embodiments, the synthesized frequency 305 may be an LO frequency (fLO).

Figure 4:
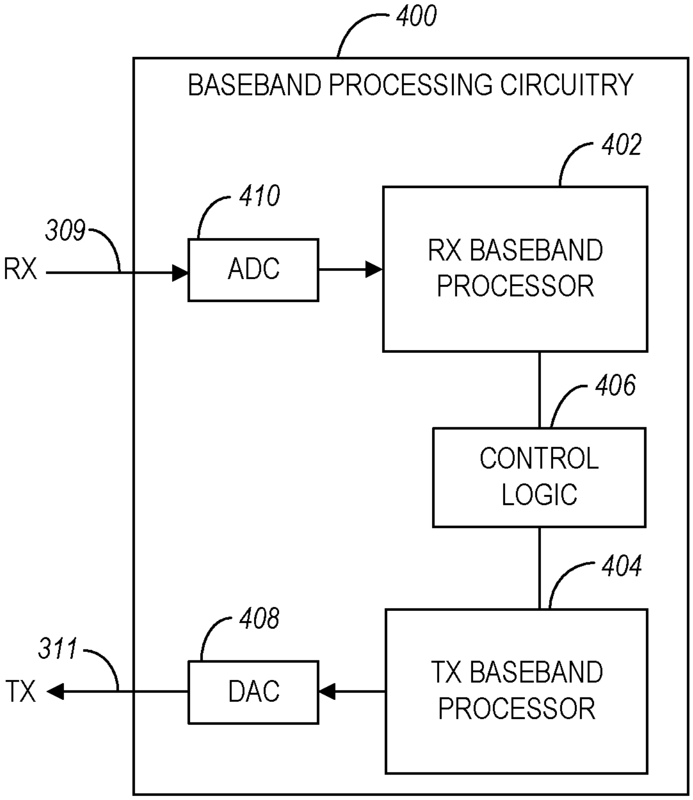
FIG. 4 illustrates a baseband processing circuitry for use in the radio architecture of FIG. 1, in accordance with some embodiments.

FIG. 4 illustrates a baseband processing circuitry 400 for use in the radio architecture of FIG. 1, in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1)

and a transmit baseband processor (TX BBP) 404 for generating baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include an analog-to-digital converter (ADC) 410 to convert analog baseband signals 309 received from the radio IC circuitry 106 to digital baseband signals for processing by the RX BBP 402. In these embodiments, the baseband processing circuitry 400 may also include a digital-to-analog converter (DAC) 408 to convert digital baseband signals from the TX BBP 404 to analog baseband signals 311.

In some embodiments that communicate OFDM signals or OFDMA signals, such as through the WLAN baseband processing circuitry 108A, the TX BBP 404 may be configured to generate OFDM or OFDMA signals as appropriate for transmission by performing an inverse fast Fourier transform (IFFT). The RX BBP 402 may be configured to process received OFDM signals or OFDMA signals by performing an FFT. In some embodiments, the RX BBP 402 may be configured to detect the presence of an OFDM signal or OFDMA signal by performing an autocorrelation, to detect a preamble, such as a short preamble, and performing a cross-correlation, to detect a long preamble. The preambles may be part of a predetermined frame structure for Wi-Fi communication.

Referring back to FIG. 1, in some embodiments, the one or more antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Although the radio architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Figure 5:
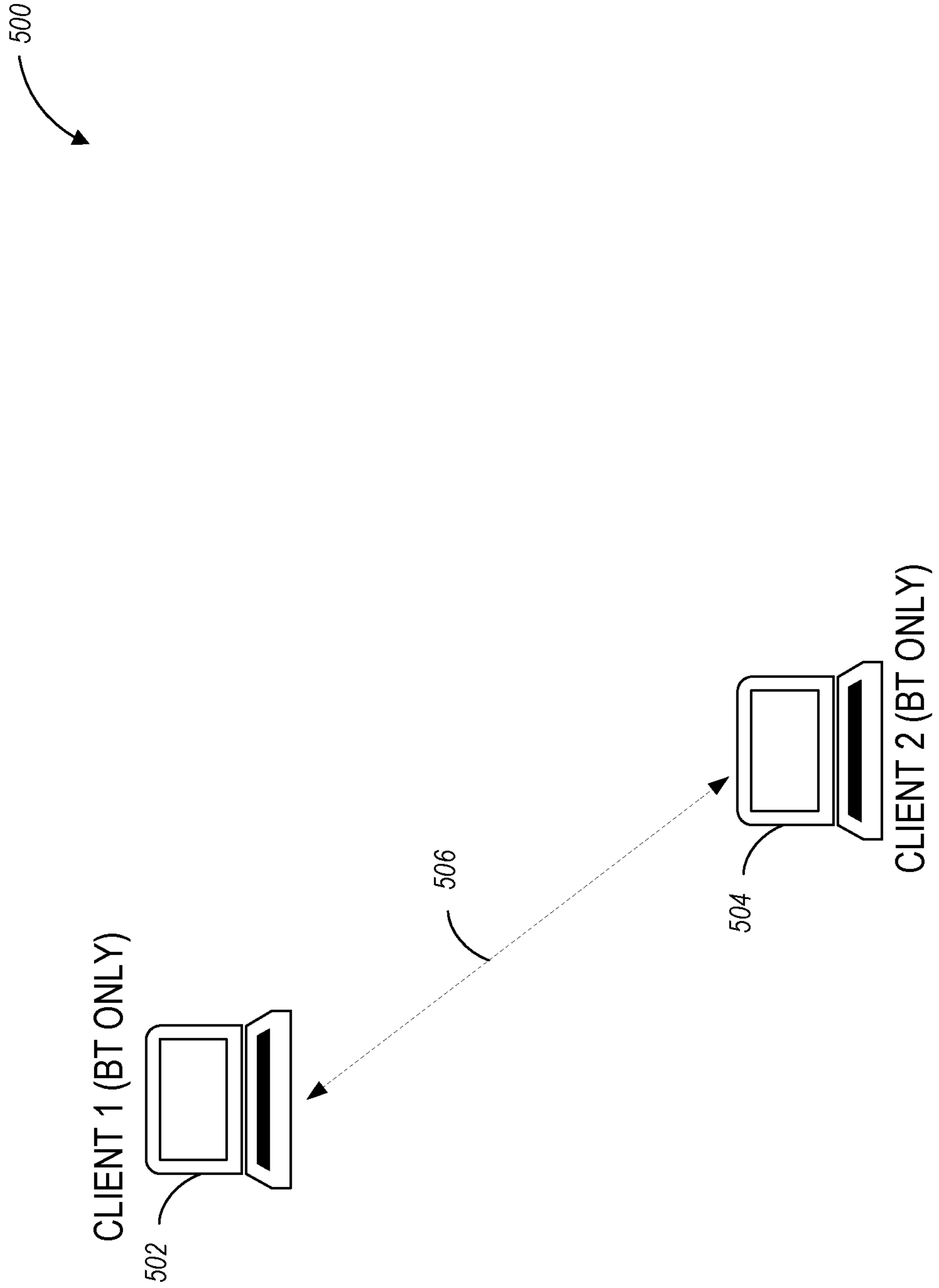
FIG. 5 is a diagram of a communication exchange between client devices configured for BT communication, in accordance with some embodiments.

In some embodiments, WiGig/mmW antennas can be used for real-time sensing and determining environmental conditions including the air index, oxygen level, water vapor (humidity) level, and other environmental conditions of the surrounding atmosphere in the vicinity of the antennas. More specifically, WiGig and 5G mmW antennas are sharp beam array antennas that can be used as mono-static radar for sensing applications. The atmosphere particles and gases are prone to certain frequency bands (e.g., WiGig and mmW bands as illustrated in FIG. 5) and absorb the signal for a particular frequency. This feature of signal absorption can be used for sensing purposes and the determination of environmental conditions. In some aspects, sensing data collected from signal attenuation at a particular frequency can be used as an indicator for environmental conditions.

The disclosed environmental conditions sensing applications can be configured using built-in antennas, without any additional antenna requirements, and can be used to detect such environmental conditions in real-time with optional notification and other device control functions (e.g., automatically activate or deactivate air conditioning, air purification, humidification, dehumidification, etc.).

Worldwide 6 GHz License-Exempt Spectrum Status

Many regulators worldwide have allocated the whole or part of the 6 GHz band (5925-7125 MHz) as a license-exempt spectrum, while some others are in the consultation process or are considering. The 6 GHz spectrum is sufficiently wide to accommodate the two widely used unlicensed technologies, WLAN and Bluetooth. Below are some examples of the 6 GHz license-exempt spectrum allocations globally:

(a) USA: 5925-7125 MHz allocated, Standard Power (SP) and Low Power Indoor (LPI) are authorized, and VLP and Client-to-Client (C2C) are being considered.

(b) Brazil: 5925-7125 MHz allocated, LPI and Very Low Power (VLP) are authorized.

(c) Korea: 5925-7125 MHz allocated, LPI and VLP are authorized, and C2C and SP are being considered.

(d) Europe/CEPT countries: 5945-6425 MHz, LPI, VLP, and C2C are authorized, and SP is being considered.

Modes of Operation

As policymakers and regulators worldwide open the 6 GHz band for license-exempt operation, they are typically considering and acting upon three distinct classes/modes of operation:

(a) Standard Power (SP)—up to ~4 W Equivalent, Isotropically Radiated Power (EIRP), indoor/outdoor, can support connectorized antennas—which are prohibited for LPI and requires Automated Frequency Coordination.

(b) Low Power Indoor (LPI)—up to ~250 mW or 1 W of EIRP—perhaps with a power spectral density limit, indoor only—enforced via a number of equipment restrictions, no coordination required.

(c) Very Low Power (VLP)—up to ~25 mW EIRP, indoor/outdoor, suitable for personal area communication, no coordination required.

WLAN C2C Operation

C2C operation is a WLAN use case. It is a mechanism by which a client device enables operation directly with other client devices without the need for routing signals through or association with an Access Point (AP). To implement C2C communications for indoor operation, client devices can decode a C2C enabling signal from LPI APs without necessarily associating with the APs. To ensure that C2C communications are established within the coverage area of LPI APs, clients need to receive the enabling signal stronger than a standardized threshold signal power (e.g., the C2C enabling signal that is received is associated with a signal power of at least −95 dBm/MHz). This way, client devices can operate in C2C mode with a maximum transmit power requirement for LPI clients (e.g., 24 dBm) without restricting the transmit power to a much more stringent requirement for VLP mode (e.g., 14 dBm).

Bluetooth and WLAN are two different unlicensed technologies. Although WLAN operation is typically through an AP, Bluetooth operation is not involved with an AP-type device. As stated above, WLAN C2C can operate at a higher LPI power level once it can successfully decode an enabling signal from an LPI AP at a power level higher than a specific threshold. Because Bluetooth operation is not involved with an AP device, it cannot meet the regulatory requirement of LPI C2C to operate at a higher power level (e.g. 24 dBm). Therefore, Bluetooth devices can only operate in VLP mode in the 6 GHz band with much more restricted maximum transmit power (e.g. 14 dBm). Such operation in VLP mode is illustrated in FIG. 5.

FIG. 5 is diagram 500 of a communication exchange between client devices 502 and 504 configured for BT communication, in accordance with some embodiments. More specifically, client devices 502 and 504 are configured only with BT capabilities (and no Wi-Fi capabilities). In this case, a BT communication link 506 is established between the devices, and BT communication is performed by both devices using Tx power associated with VLP mode (e.g., a max Tx power of 14 dBm).

Many devices (laptops, tablets, phones, etc.) support both WLAN and Bluetooth. The disclosed techniques can be used to enable Bluetooth to operate at a higher power level. A communication exchange based on the disclosed techniques is illustrated in FIG. 6.

Figure 6:
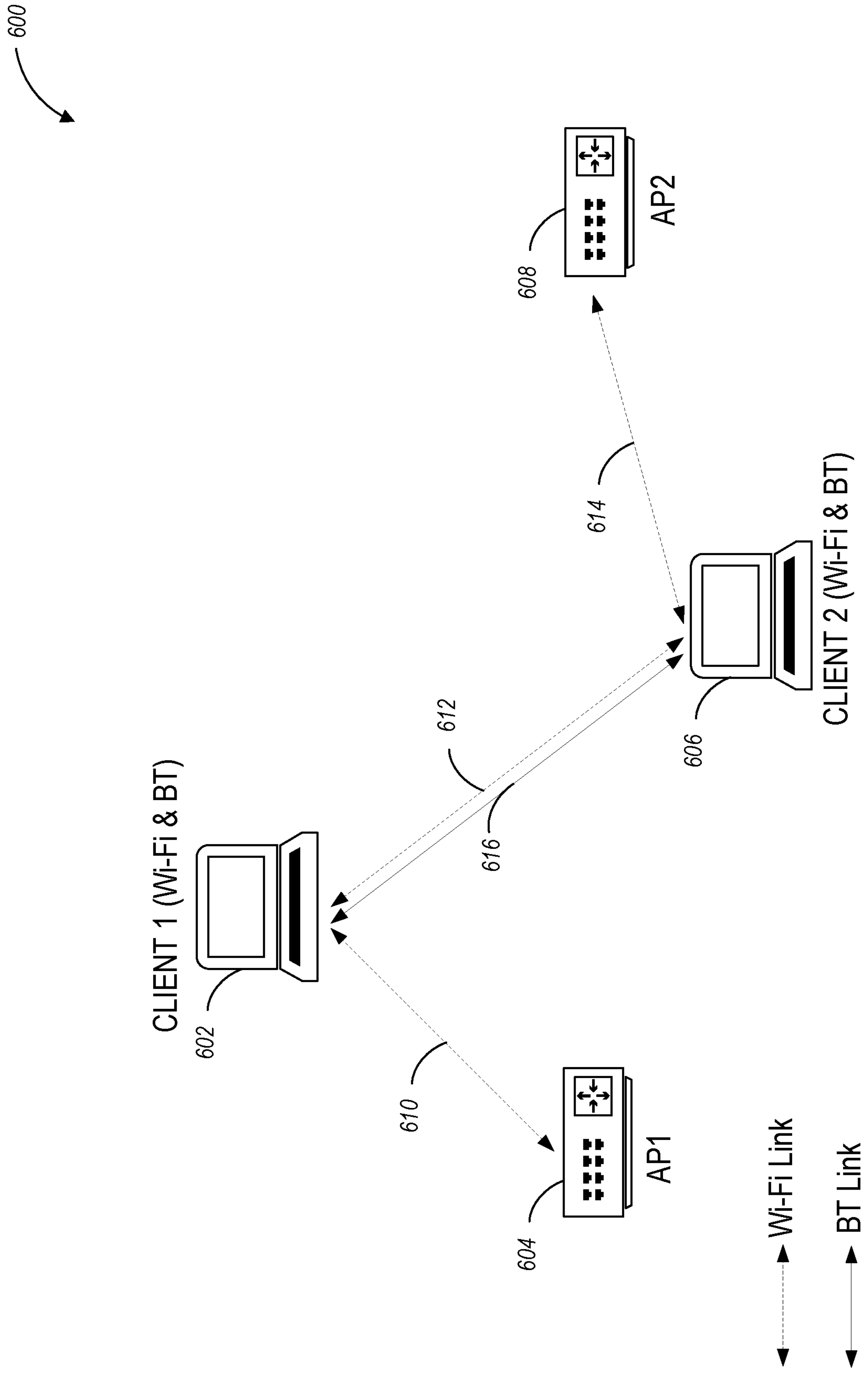
FIG. 6 is a diagram of a communication exchange between client devices configured for both BT and Wi-Fi communication, in accordance with some embodiments.

FIG. 6 is a diagram 600 of a communication exchange between client devices 602 and 606 (also referred to as computing devices) configured for both BT and Wi-Fi communication, in accordance with some embodiments.

When the WLAN component (or a Tx power configuration circuit) of client device 602 receives the C2C enabling signal from an LPI AP 604 via Wi-Fi communication link 610, which is associated with signal power greater than or equal to a pre-configured threshold level (e.g., −95 dBm/MHz), it will inform the device's Bluetooth component. Once the Bluetooth component receives the trigger signal from the WLAN component, it can operate at the LPI power level (e.g., 24 dBm), which is higher than the VLP power level (e.g., 14 dBm). A similar configuration takes place for client device 606 which receives a C2C enabling signal from AP 608 via Wi-Fi communication link 614. More specifically, client device 602 can communicate with client device 606 via a BT communication link 616 using a higher Tx power level (e.g., LPI power level), instead of using a lower Tx power level (e.g., VLP power level which can be used on communications via the Wi-Fi communication link 612).

In some aspects, the reception of the C2C enabling signal via the Wi-Fi circuitry, the determination of the signal power of the enabling signal, the verification the signal power is above the signal power threshold, and the configuration (or enabling) of the BT circuitry to communicate at the higher LPI power level is performed by the disclosed Tx power configuration circuit 105. In some aspects, the Tx power configuration circuit 105 is implemented as a stand-alone circuit, as part of the Wi-Fi circuitry, or as part of the BT circuitry of a client device.

The benefits of the disclosed techniques can be summarized as follows:

(a) Bluetooth can operate in a larger range due to the higher transmit power.

(b) Bluetooth can operate at a higher data rate because it can operate at higher modulation and coding schemes due to the higher transmit power.

(c) For the same amount of data, Bluetooth occupies less airtime due to the higher data rate, such that it generates less overall interference to other wireless users.

(d) Overall Bluetooth can save power due to the higher data rate and less airtime.

Figure 7:
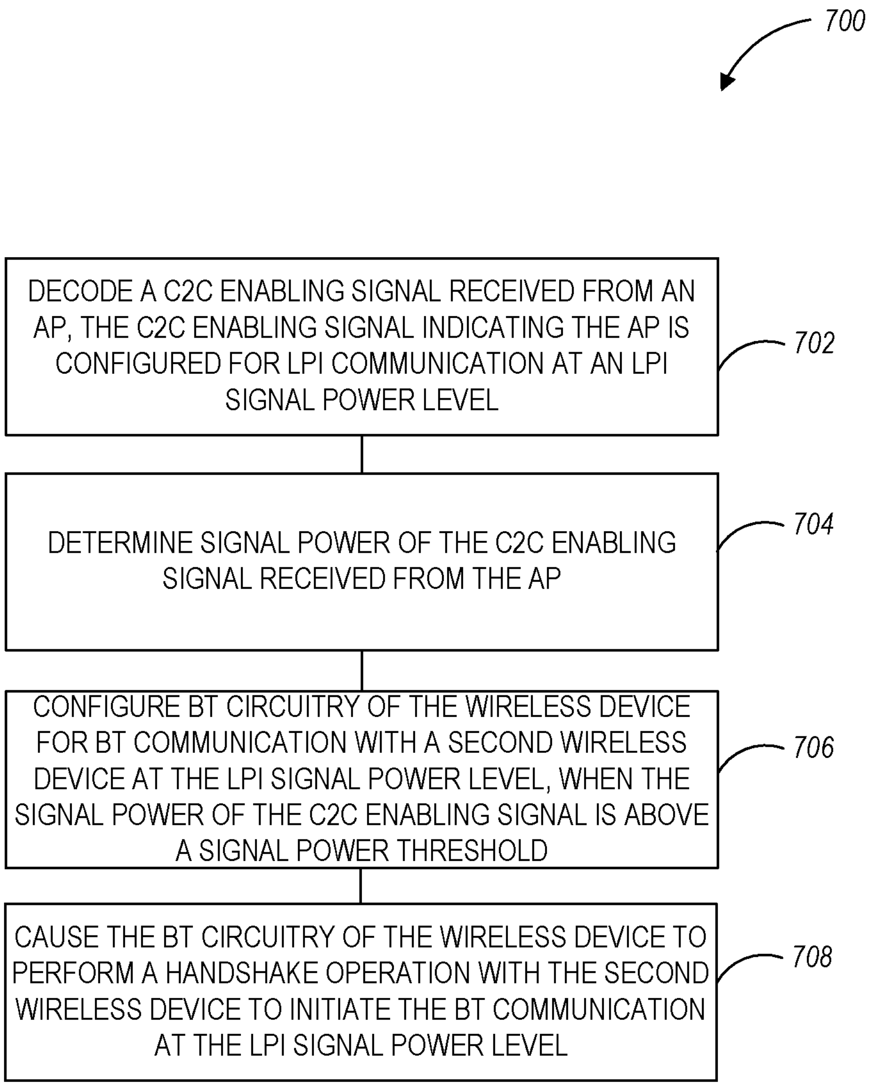
FIG. 7 illustrates a flow diagram of a method for configuring Tx power of a wireless device, in accordance with some embodiments.

FIG. 7 illustrates a flow diagram of method 700 for configuring the Tx power of a wireless device, in accordance with some embodiments. Referring to FIG. 7, method 700 includes operations 702, 704, 706, and 708, which may be executed by the Tx power configuration circuit 105 or another processor of a computing device (e.g., hardware processor 802 of device 800 illustrated in FIG. 8).

At operation 702, a client-to-client (C2C) enabling signal received from an access point (AP) is decoded. The C2C enabling signal indicates the AP is configured for Low Power Indoor (LPI) communication at an LPI signal power level.

At operation 704, the signal power of the C2C enabling signal received from the AP is determined.

At operation 706, the BT circuitry of the wireless device is configured for BT communication with a second wireless device at the LPI signal power level when the signal power of the C2C enabling signal is above a signal power threshold.

At operation 708, the BT circuitry of the wireless device is configured to perform a handshake exchange (e.g., a handshake communication exchange) with the second wireless device to initiate the BT communication at the LPI signal power level.

Figure 8:
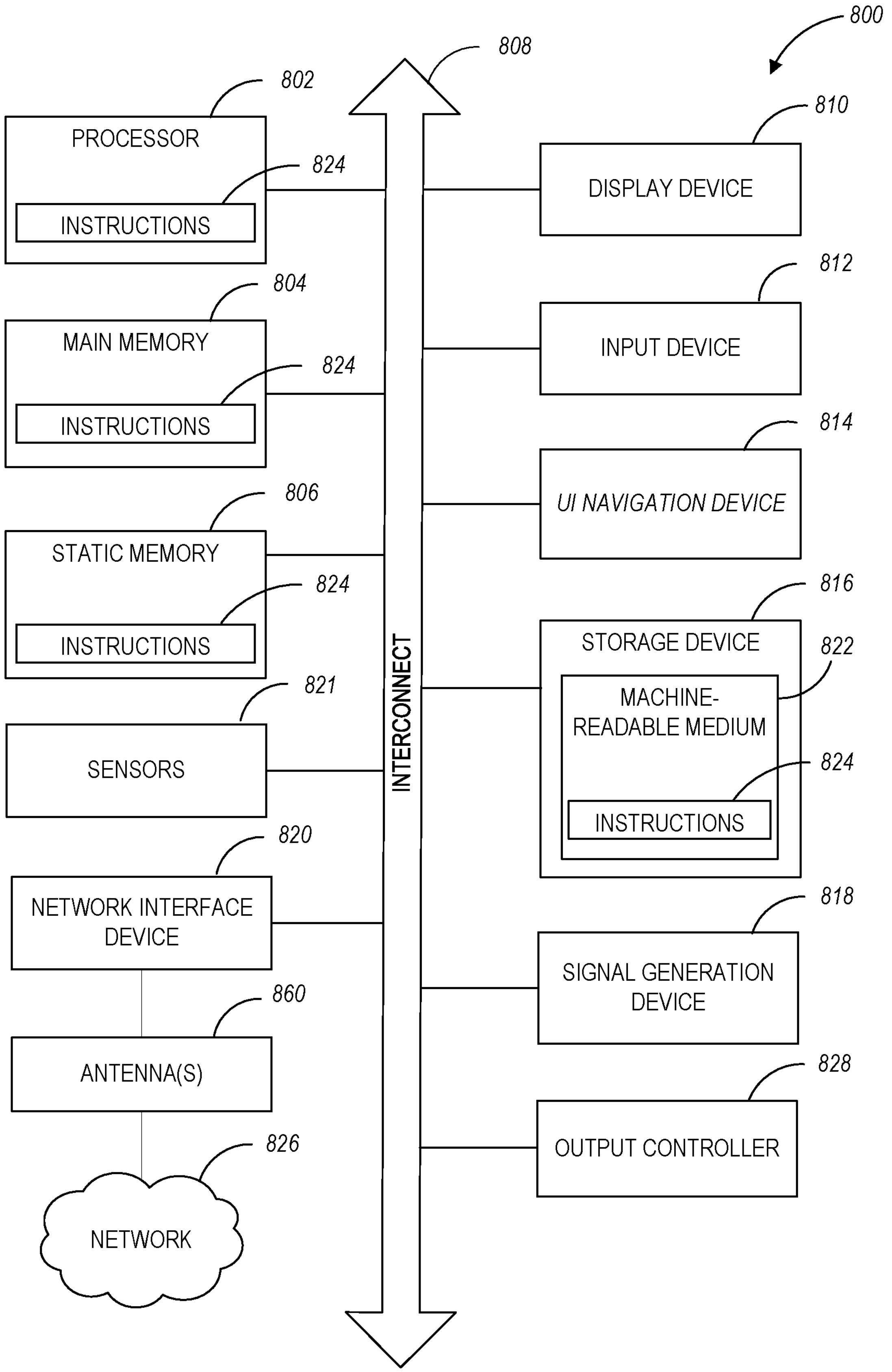
FIG. 8 illustrates a block diagram of an example machine upon which any one or more of the operations/techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, machine 800 may operate in the capacity of a server machine, a client machine, or both in server-client network environments. In an example, machine 800 may act as a peer machine in a peer-to-peer (P2P) (or other distributed) network environment. The machine 800 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 800 may include a hardware processor 802 (e.g., a central processing unit (CPU), a graphics processing unit (GPU), a hardware processor core, or any combination thereof), a main memory 804, and a static memory 806, some or all of which may communicate with each other via an interlink (e.g., bus) 808.

Specific examples of main memory 804 include Random Access Memory (RAM), and semiconductor memory devices, which may include, in some embodiments, storage locations in semiconductors such as registers. Specific examples of static memory 806 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

Machine 800 may further include a display device 810, an input device 812 (e.g., a keyboard), and a user interface (UI) navigation device 814 (e.g., a mouse). In an example, the display device 810, input device 812, and UI navigation device 814 may be touch screen displays. The machine 800 may additionally include a storage device (e.g., drive unit or another mass storage device) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 802 and/or instructions 824 may comprise processing circuitry and/or transceiver circuitry.

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 822 is illustrated as a single medium, the term "machine-readable medium" may include a single medium or multiple media (e.g., a centralized or distributed database, and/or associated caches and servers) configured to store one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, one or more sensors 821, a network interface device 820, antennas 860, a display device 810, an input device 812, a UI navigation device 814, a storage device 816, instructions 824, a signal generation device 818, and an output controller 828. The apparatus may be configured to perform one or more of the methods and/or operations disclosed herein. The apparatus may be intended as a component of the machine 800 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 800 and that causes the machine 800 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding, or carrying instructions for execution by the machine 800, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usage between this document and those documents so incorporated by reference, the usage in the incorporated reference(s) is supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each antenna and the antennas of a transmitting station. In some MIMO embodiments, antennas may be separated by up to 1/10 of a wavelength or more.

Described implementations of the subject matter can include one or more features, alone or in combination as illustrated below by way of examples.

Example 1 is an apparatus for a wireless device, the apparatus comprising: memory; and processing circuitry coupled to the memory, the processing circuitry is to: decode a client-to-client (C2C) enabling signal received from an access point (AP), the C2C enabling signal indicating the AP is configured for Low Power Indoor (LPI) communication at an LPI signal power level; determine signal power of the C2C enabling signal received from the AP; configure Bluetooth (BT) circuitry of the wireless device for BT communication with a second wireless device at the LPI signal power level, when the signal power of the C2C enabling signal is above a signal power threshold; and cause the BT circuitry of the wireless device to perform a handshake exchange with the second wireless device to initiate the BT communication at the LPI signal power level.

In Example 2, the subject matter of Example 1 includes subject matter where the processing circuitry is to: configure the BT circuitry of the wireless device for BT communication with the second wireless device at a Very Low Power (VLP) signal power level when the signal power of the C2C enabling signal is smaller than or equal to the signal power threshold.

In Example 3, the subject matter of Examples 1-2 includes subject matter where to determine the signal power, the processing circuitry is to: determine maximum mean power spectral density of the C2C enabling signal.

In Example 4, the subject matter of Example 3 includes subject matter where the processing circuitry is to: configure the BT circuitry of the wireless device for BT communication with the second wireless device at the LPI signal power level when the maximum mean power spectral density of the C2C enabling signal is above the signal power threshold. In some embodiments, the signal power threshold is −95 decibel milliwatts per MHz (dBm/MHz).

In Example 5, the subject matter of Examples 3-4 includes subject matter where to perform the handshake exchange, the processing circuitry is further to: decode a confirmation signal from the second wireless device, the confirmation signal indicating BT circuitry of the second wireless device is configured for the BT communication at the LPI signal power level.

In Example 6, the subject matter of Example 5 includes subject matter where the processing circuitry is further to: encode a configuration message for transmission to the second wireless device, the configuration message indicating a communication channel for performing the BT communication.

In Example 7, the subject matter of Example 6 includes the subject matter where the processing circuitry is to: select the communication channel as a 6 GHz band communication channel.

Example 8 is a method for configuring Bluetooth transmission power of a wireless device, the method comprising: decoding a client-to-client (C2C) enabling signal received from an access point (AP), the C2C enabling signal indicating the AP is configured for Low Power Indoor (LPI) communication at an LPI signal power level; determining signal power of the C2C enabling signal received from the AP; configuring Bluetooth (BT) circuitry of the wireless device for BT communication with a second wireless device at the LPI signal power level when the signal power of the C2C enabling signal is above a signal power threshold, and causing the BT circuitry of the wireless device to perform a handshake exchange with the second wireless device to initiate the BT communication at the LPI signal power level.

In Example 9, the subject matter of Example 8 includes, configuring the BT circuitry of the wireless device for BT communication with the second wireless device at a Very Low Power (VLP) signal power level when the signal power of the C2C enabling signal is smaller than or equal to the signal power threshold.

In Example 10, the subject matter of Examples 8-9 includes subject matter where determining the signal power further comprises: determining maximum mean power spectral density of the C2C enabling signal.

In Example 11, the subject matter of Example 10 includes, configuring the BT circuitry of the wireless device for BT communication with the second wireless device at the LPI signal power level, when the maximum mean power spectral density of the C2C enabling signal is above the threshold, e.g. −95 decibel milliwatts per MHz (dBm/MHz).

In Example 12, the subject matter of Examples 10-11 includes subject matter where performing the handshake exchange further comprises: decoding a confirmation signal from the second wireless device, the confirmation signal indicating BT circuitry of the second wireless device is configured for the BT communication at the LPI signal power level.

In Example 13, the subject matter of Example 12 includes, encoding a configuration message for transmission to the second wireless device, and the configuration message indicating a communication channel for performing the BT communication.

In Example 14, the subject matter of Example 13 includes, selecting the communication channel as a 6 GHz band communication channel.

Example 15 is an apparatus for a wireless device, the apparatus comprising: wireless local area network (WLAN) circuitry, the WLAN circuitry configured to receive a client-to-client (C2C) enabling signal from an access point (AP), the C2C enabling signal indicating the AP is configured for Low Power Indoor (LPI) communication at an LPI signal power level; Bluetooth (BT) circuitry; and transmit (Tx) power configuration circuitry, the Tx power configuration circuitry coupled to the WLAN circuitry and the BT circuitry, and the TX power configuration circuitry is to: determine signal power of the C2C enabling signal received from the AP; configure the BT circuitry for BT communication with a second wireless device using Tx power set at the LPI signal power level, when the signal power of the C2C enabling signal is above a signal power threshold; and cause the BT circuitry of the wireless device to perform a handshake exchange with the second wireless device to initiate the BT communication at the LPI signal power level.

In Example 16, the subject matter of Example 15 includes subject matter where the TX power configuration circuitry is to: configure the BT circuitry of the wireless device for BT communication with the second wireless device at a Very Low Power (VLP) signal power level when the signal power of the C2C enabling signal is smaller than or equal to the signal power threshold.

In Example 17, the subject matter of Examples 15-16 includes subject matter where to determine the signal power, the TX power configuration circuitry is to: determine maximum mean power spectral density of the C2C enabling signal.

In Example 18, the subject matter of Example 17 includes subject matter where the TX power configuration circuitry is to: configure the BT circuitry of the wireless device for BT communication with the second wireless device at the LPI signal power level when the maximum mean power spectral density of the C2C enabling signal is above the signal power threshold (e.g., −95 decibel milliwatts per MHz (dB m/MHz)).

In Example 19, the subject matter of Examples 17-18 includes subject matter where to perform the handshake exchange, the TX power configuration circuitry is to: decode a confirmation signal from the second wireless device, the confirmation signal indicating BT circuitry of the second wireless device is configured for the BT communication at the LPI signal power level.

In Example 20, the subject matter of Example 19 includes subject matter where the TX power configuration circuitry is to: encode a configuration message for transmission to the second wireless device, the configuration message indicating a communication channel for performing the BT communication.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. An apparatus comprising:

memory; and processing circuitry coupled to the memory, the processing circuitry is to:

decode a client-to-client (C2C) enabling signal received from an access point (AP), the C2C enabling signal indicating the AP is configured for Low Power Indoor (LPI) communication at an LPI signal power level;

determine received signal power of the C2C enabling signal received from the AP;

configure Bluetooth (BT) circuitry for BT communication with a wireless device using transmit power set at the LPI signal power level, when the received signal power of the C2C enabling signal is above a signal power threshold; and cause the BT circuitry to perform a handshake exchange with the wireless device to initiate the BT communication using the transmit power set at the LPI signal power level.

2. The apparatus of claim 1, wherein the processing circuitry is to:

configure the BT circuitry for BT communication with the wireless device at a Very Low Power (VLP) signal power level, when the signal power of the C2C enabling signal is smaller than or equal to the signal power threshold.

3. The apparatus of claim 1, wherein to determine the signal power, the processing circuitry is to:

determine a maximum mean power spectral density of the C2C enabling signal.

4. The apparatus of claim 3, wherein the processing circuitry is to:

configure the BT circuitry for BT communication with the wireless device at the LPI signal power level, when the maximum mean power spectral density of the C2C enabling signal is above the signal power threshold.

5. The apparatus of claim 3, wherein to perform the handshake exchange, the processing circuitry is further to:

decode a confirmation signal from the wireless device, the confirmation signal indicating BT circuitry of the wireless device is configured for the BT communication at the LPI signal power level.

6. The apparatus of claim 5, wherein the processing circuitry is further to:

encode a configuration message for transmission to the wireless device, the configuration message indicating a communication channel for performing the BT communication.

7. The apparatus of claim 6, wherein the processing circuitry is to:

select the communication channel as a 6 GHz band communication channel.

8. A method for configuring Bluetooth transmission power of a wireless device, the method comprising:

decoding a client-to-client (C2C) enabling signal received from an access point (AP), the C2C enabling signal indicating the AP is configured for Low Power Indoor (LPI) communication at an LPI signal power level;

determining received signal power of the C2C enabling signal received from the AP;

configuring Bluetooth (BT) circuitry of the wireless device for BT communication with a second wireless device using transmit power set at the LPI signal power level, when the received signal power of the C2C enabling signal is above a signal power threshold; and causing the BT circuitry of the wireless device to perform a handshake exchange with the second wireless device to initiate the BT communication using the transmit power set at the LPI signal power level.

9. The method of claim 8, further comprising:

configuring the BT circuitry of the wireless device for BT communication with the second wireless device at a Very Low Power (VLP) signal power level, when the signal power of the C2C enabling signal is smaller than or equal to the signal power threshold.

10. The method of claim 8, wherein determining the signal power further comprises:

determining a maximum mean power spectral density of the C2C enabling signal.

11. The method of claim 10, further comprising:

configuring the BT circuitry of the wireless device for BT communication with the second wireless device at the LPI signal power level, when the maximum mean power spectral density of the C2C enabling signal is above the signal power threshold.

12. The method of claim 10, wherein performing the handshake exchange further comprises:

decoding a confirmation signal from the second wireless device, the confirmation signal indicating BT circuitry of the second wireless device is configured for the BT communication at the LPI signal power level.

13. The method of claim 12, further comprising:

encoding a configuration message for transmission to the second wireless device, the configuration message indicating a communication channel for performing the BT communication.

14. The method of claim 13, further comprising:

selecting the communication channel as a 6 GHz band communication channel.

15. An apparatus comprising:

wireless local area network (WLAN) circuitry, the WLAN circuitry configured to receive a client-to-client (C2C) enabling signal from an access point (AP), the C2C enabling signal indicating the AP is configured for Low Power Indoor (LPI) communication at an LPI signal power level;

Bluetooth (BT) circuitry; and transmit (TX) power configuration circuitry, the TX power configuration circuitry coupled to the WLAN circuitry and the BT circuitry, and the TX power configuration circuitry is to:

determine received signal power of the C2C enabling signal received from the AP;

configure the BT circuitry for BT communication with a wireless device using TX power set at the LPI signal power level, when the received signal power of the C2C enabling signal is above a signal power threshold; and cause the BT circuitry to perform a handshake exchange with the wireless device to initiate the BT communication using the transmit power set at the LPI signal power level.

16. The apparatus of claim 15, wherein the TX power configuration circuitry is to:

configure the BT circuitry for BT communication with the wireless device at a Very Low Power (VLP) signal power level, when the signal power of the C2C enabling signal is smaller than or equal to the signal power threshold.

17. The apparatus of claim 15, wherein to determine the signal power, the TX power configuration circuitry is to:

determine a maximum mean power spectral density of the C2C enabling signal.

18. The apparatus of claim 17, wherein the TX power configuration circuitry is to:

configure the BT circuitry for BT communication with the wireless device at the LPI signal power level, when the maximum mean power spectral density of the C2C enabling signal is above the signal power threshold.

19. The apparatus of claim 17, wherein to perform the handshake exchange, the TX power configuration circuitry is to:

decode a confirmation signal from the wireless device, the confirmation signal indicating BT circuitry of the wireless device is configured for the BT communication at the LPI signal power level.

20. The apparatus of claim 19, wherein the TX power configuration circuitry is to:

encode a configuration message for transmission to the wireless device, the configuration message indicating a communication channel for performing the BT communication; and select the communication channel as a 6 GHz band communication channel.

* * * * *